3,260,552
VEHICLE BRAKE SYSTEM
Maxwell L. Cripe, South Bend, Ind., assignor to The Bendix Corporation, South Bend, Ind., a corporation of Delaware
Filed Mar. 23, 1964, Ser. No. 353,695
6 Claims. (Cl. 303—6)

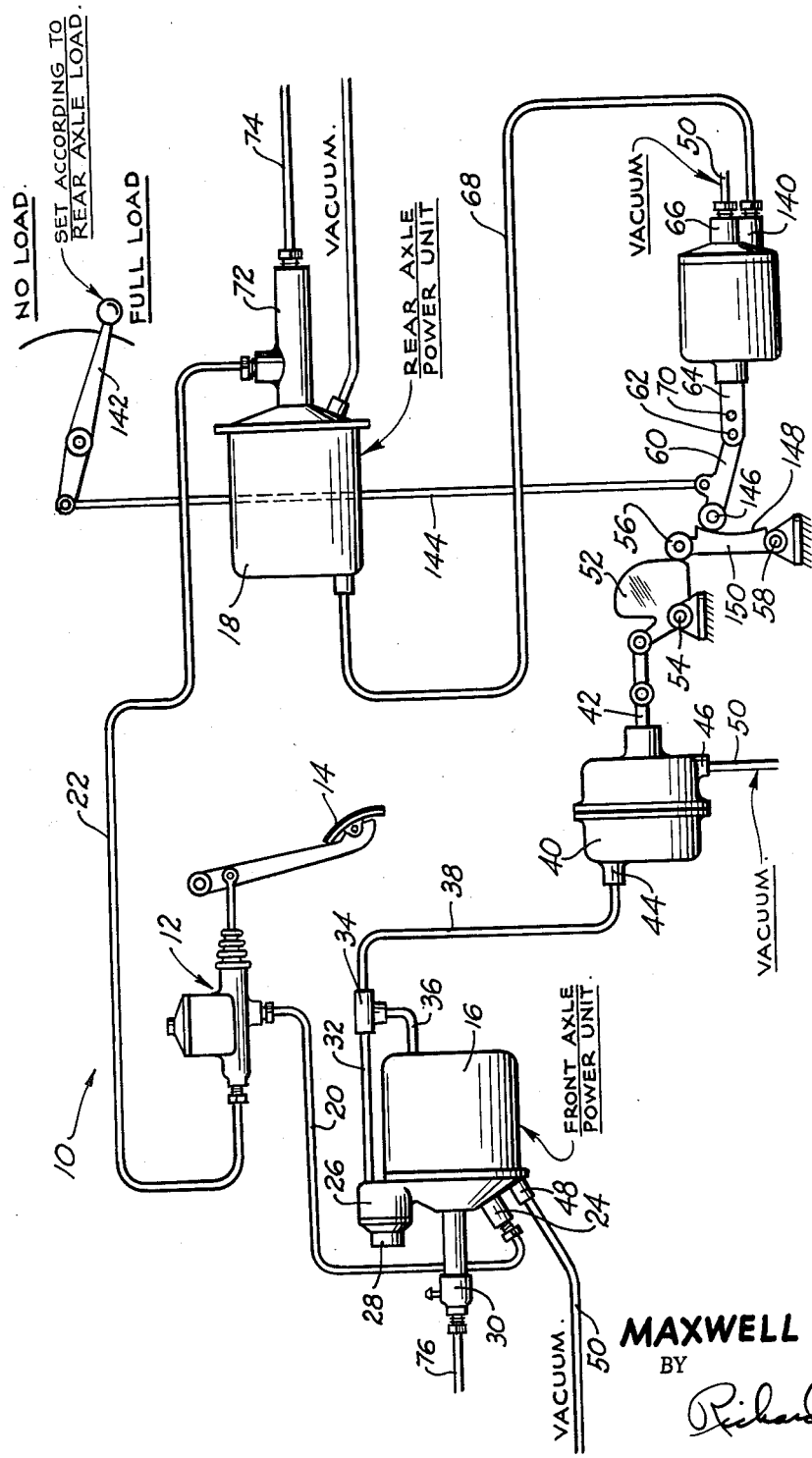

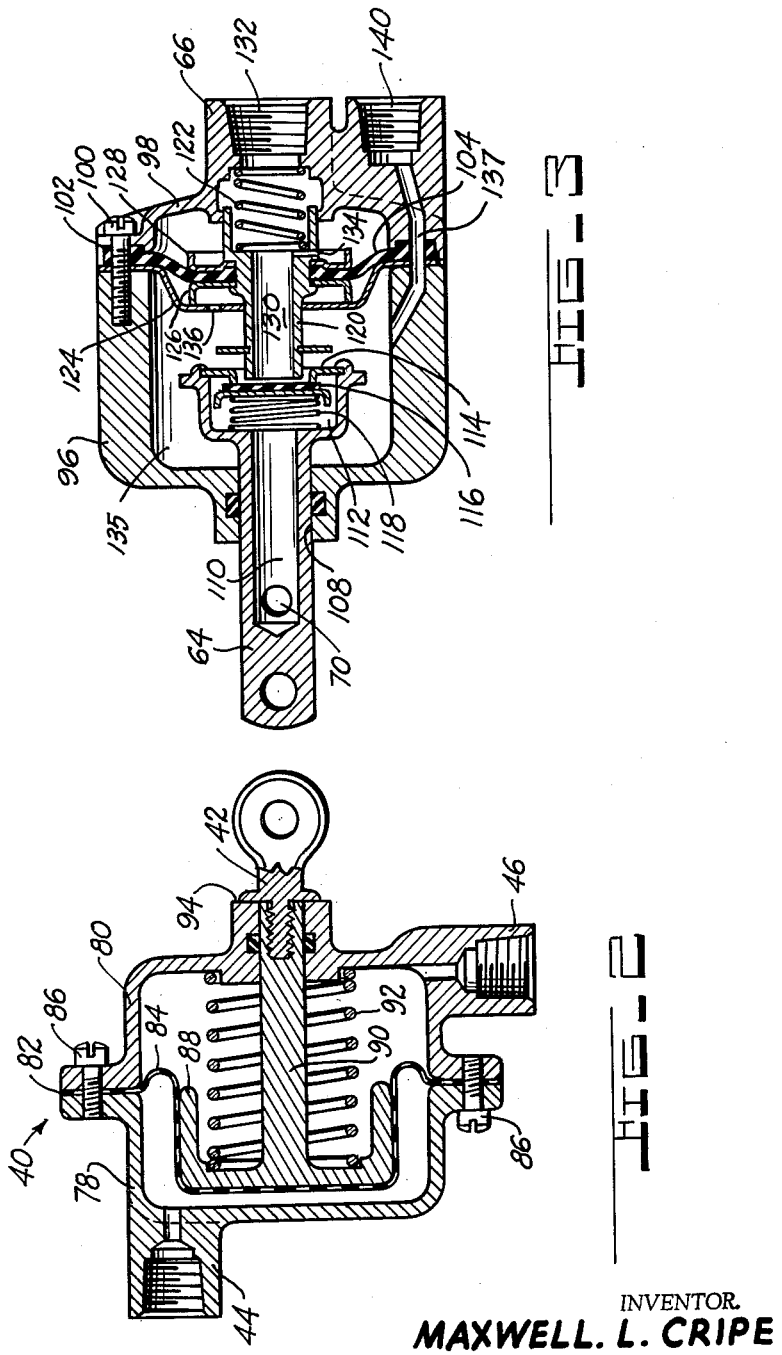
INVENTOR.
MAXWELL. L. CRIPE

# United States Patent Office 3,260,552
Patented July 12, 1966

This invention relates to a brake proportioning means for automotive passenger and commercial vehicles and refers, more particularly, to fluid braking systems having means to regulate braking forces by modulation of hydraulic pressures in accordance with loading conditions for the vehicle.

As a vehicle is decelerated in response to braking the dynamic weight of the vehicle is thrown forwardly thereby requiring more braking effort on the front wheels and less braking effort on the rear wheels which is more in proportion to the dynamic weight distribution of the vehicle. For this reason it is desirable to provide a means for distributing the braking effort on the front and rear wheels more in proportion to the dynamic loads on the vehicle wheels. Accordingly, this invention is intended to accomplish this result.

The principal object of the present invention is, therefore, to provide a brake apparatus wherewith the braking forces effective on the respective wheels are directly proportional to the load carried or acting thereon.

It is more particularly an object of the present invention to provide a means for proportioning braking pressures that will take into account varying loads for the vehicle.

It is a still further object of my invention to provide a brake proportioning system wherein a rear axle power unit is controlled by a manual static load lever used in conjunction with a vacuum diaphragm chamber controlled by a front axle power unit.

A still further object of my invention is to provide a vehicle with a primary and a secondary power brake means with the control of the primary brake means being linked to the control of the secondary brake means, which link contains a cam follower means for actuating said secondary valve unit which follower means is variably positioned by a lever adjusted in accordance with a load carried by the associated vehicle.

Other objects and advantages of my invention will appear from the drawings:

FIGURE 1 is a schematic brake system embodying the principles of my invention;

FIGURE 2 is a cross-sectional view of a pressure responsive means linking two control means in accordance with the principles of my invention; and FIGURE 3 is a cross-sectional view of a control valve constructed in accordance with the principles of my invention.

For any vehicle manufactured today there is generally a compromise of design to approximate the idealized braking efforts to front and rear axle. It is, however, incumbent upon the manufacturer of vehicles and brakes alike today to realize that this ideal-distribution is at best a compromise and that it would be much more practical to provide, at I do by this invention, a means of producing several front to rear braking effort ratios.

It has been my experience, and no doubt the experience of others skilled in the art to which my invention relates, that the prior art is replete with means for producing an approximation to the aforesaid ideal-distribution such as by means of a tilted mercury switch shutoff means, or by means of a regulating valve which gives a different straight-line slope to the rear brake effort. In fact I have seen devices which reference load by sensing a distance between a rear axle and a frame of the vehicle. Needless, to say, we do not live in a nation of smooth roads, and the problem of bumpy roads would cause trouble to both of the aforesaid systems.

Therefore, and as seen in the drawing, I have provided a vehicle braking system 10 which will provide brake proportioning without regard to condition of terrain. More particularly, I have provided a vehicle with a conventional master cylinder 12 actuated by a brake pedal 14 for providing brake pressure to a primary power brake servomotor 16 and a secondary power brake servomotor 18 by way of conduits 20 and 22, respectively.

As seen, fluid from the master cylinder 12, which in this case is shown as being a split-type master cylinder for purposes of providing fail-safe features, is communicated by conduit 20 to a hydraulic inlet 24 of the primary servomotor 16. For internal construction of the primary motor 16 attention is directed to my Patent No. 3,031,851, issued May 1, 1962. As seen in this patent the incoming hydraulic fluid from the master cylinder will be directed to a pressure responsive means for actuation of a control valve shown in block form, as at 26, in the instant application. This control valve is adapted to normally suspend a movable wall (not shown) within the primary servomotor 16 with equalized pressures such that a spring (not shown) also within the primary servomotor may hold the aforesaid movable wall in a non-actuated position. The valve is provided with an atmospheric pressure inlet 28 which upon actuation of the valve will be communicated to one side of the movable wall to move it in opposition to the spring and create a hydraulic pressure in a slave cylinder 30. The control pressure and suspension pressure is normally communicated to the control side of the movable wall by means of a conduit 32, which in the instant application is provided with a T fitting 34 and a short conduit 36 leading to within the servomotor 16.

As seen, a further conduit 38 is connected to the T fitting 34 which leads to a pressure responsive means 40 having a movable wall 84 therein which is affixed to a force transmitting rod 42. As seen, the conduit 38 is connected with an inlet 44 of the pressure responsive means 40 and an additional pressure fluid inlet 46 is arranged to communicate a fluid to the pressure responsive device on the opposite side of the movable wall 84. Normally the inlet 46 and an inlet 48 of the primary servomotor 16 are connected to a vacuum source as by a conduit 50 that is, for example, connected with an engine manifold (not shown) of the associated vehicle power plant. Thus, under non-actuated conditions the vacuum is communicated to either side of the movable wall in the primary servomotor 16 and to either side of the movable wall in the pressure responsive device 40, and upon actuation of the brake pedal 14 the control valve is actuated to allow atmospheric pressure to communicate to one side of the aforesaid movable walls to create movement thereof which in the case of the primary servomotor will, as aforesaid, cause actuation of the slave cylinder 30 and in the case of the pressure responsive device 40 cause extension of the rod 42 to rotate a cam 52 about a pivot 54. While I have discussed a vacuum type power brake, I do not wish to be so limited for it is a simple matter to adapt the system to high air pressure over atmosphere.

As the cam 52 is rotated about the pivotal connection 54 a follower 56 is also rotated about a pivot 58 to cause reciprocatory motion of a lever 60 that is pivotally connected as at 62 to a valve actuating rod 64. Reciprocatory movement of the valve actuating rod 64 will cause the closing of communication of vacuum, supplied to the valve as by a continuation of conduit 50 to a vacuum inlet 66, to the secondary servomotor 18 by way of a conduit 68. Further inward movement of the valve control rod 64 will open a poppet that allows an atmospheric port 70 to communicate atmosphere to the conduit 68 by way of an internal passage, as will be hereinafter explained in more detail. This then will actuate a movable wall within the secondary servomotor 18 to pressurize a slave cylinder 72 and apply a wheel cylinder connected therewith as by the conduit 74 similar to the application of braking pressure to a wheel cylinder connected with a conduit 76 of the slave cylinder 30. The secondary power unit 18 would be similar to that shown in my Patent No. 3,113,806, issued December 10, 1963, wherein the brake fluid pressure from the master cylinder 12 by way of conduit 22 is introduced in such a manner as to replenish fluid within the associated braking system served by the slave cylinder 72, which replenishment is terminated upon actuation of the movable wall of the secondary power servomotor 18. It is to be understood that similar means for replenishing the fluid in the brake system served by the sleeve cylinder 30 is also provided and shown by the other of my aforesaid patents.

For further details of my pressure responsive device 40 and the valve controlling the secondary motor 18, the reader's attention is directed to FIGURES 2 and 3, respectively. In more detail the pressure responsive device is comprised of two cup-shaped housing portions 78 and 80, having the periphery 82 of a flexible movable wall 84 sealing the juncture of same, held by a plurality of bolts 86. The flexible movable wall is operatively connected to a rigid annular member 88 having a stem 90 reciprocatorily mounted through an opening in the cup-shaped housing portion 80. In addition, I have provided a spring 92 to bias the movable wall assembly towards the inlet 44 whereby in a normal, non-actuated position, the wall, being suspended by equal pressures at inlets 44 and 46 will hold the force transmitting member 42 against a flange 94 of the cup-shaped portion 80. It may thus be readily observed that upon the introduction of atmospheric pressure at inlet 44 the wall 84 will force the force transmitting member 42 off the flange 94 to start the pivoting of the cam 52, as aforementioned.

As for the details of the valve controlling the secondary servomotor 18, I have shown in FIGURE 3 that the valve is comprised of similar construction as the pressure responsive device 40 having a cup-shaped portion 96 closed by another cup-shaped portion 98 by means of bolts 100 and sealed by the peripheral portions 102 of a flexible wall 104. A valve stem 64 is reciprocatorily and sealingly mounted through an opening 108 in the portion 96, which valve stem is adapted to be pivotally mounted as by means of the pin 62 to the lever 60 aforementioned. In addition, the valve stem 64 is provided with the opening or port 70 communicating with an axial passage 110 that leads to a chamber 112 closed by a valve seat 114 and a valve poppet 116 held against the seat by a spring 118.

The flexible wall 104 movably mounts a valve member 120 that is biased by a spring 122 inwardly of portion 98. The member 120 is prevented from normally contacting the spring biased poppet 116 by means of a partition 124 cooperating with a stop plate member 126 mounted to the member 120 immediately behind the flexible wall or diaphragm 104. As seen, a similar stop plate 128 is mounted to the member 120 forwardly of the diaphragm 104 to cooperate with the inner surface of the portion 98 and provide a stop for the member 120 in the opposite direction.

As seen the member 120 has a central passage 130 that is communicated with an inlet 132 and as the member 120 is provided with a radial passage 134 and the partition is provided with an axial passage 136 the diaphragm 104 is normally suspended by equal pressures so that the spring 122 will control the positioning of the member 120. However, as the valve stem 64 is moved inwardly as by the aforementioned lever 60 the member 120 seats on the poppet 116 to close off communication of inlet 132 with a chamber 135 in the portion 96. Further inward movement of the stem 64 will unseat poppet 116 to provide communication of the passage 110 with the chamber 135 and by means of a passage 137 within the portions 96 and 98 to an outlet 140 that is communicated by means of conduit 68 to a control chamber for the secondary servomotor 18. At the same time the atmospheric pressure in chamber 134 is communicated to the rear of the diaphragm 104 to oppose the sub-atmospheric pressure on the other side of the diaphragm to move the member 120 back until the poppet 116 is again seated on the seat 114.

In operation, as a lever 142 is actuated in accordance with the loading of the associated vehicle, a rod 144 will position the lever 60 by moving a follower 146 along a cam surface 148 formed as an arcuate face on the cam follower link 150 to thereby regulate the amount of movement for the valve stem 64 to increase or decrease the amount of travel necessary to open the valve poppet 116.

It is apparent that the examples shown above have been given solely by way of illustration and not by way of limitation and that they are subject to many variations and modifications within the scope of the present invention. All these variations and modifications are to be included within the scope of the present invention defined by the appended claims.

I claim:

1. For a vehicle brake system having a primary servomotor and a secondary servomotor actuated by a first and second control valve means, respectively, a means to connect said first and second control valve means comprising:

a pressure responsive member arranged to be suspended between a reference pressure medium and a control pressure medium within said primary servomotor, said pressure responsive means having a force transmitting member operatively connected thereto;

a cam means arranged to pivot upon reciprocation of said force transmitting means;

a cam follower operatively connected to said cam means, said cam follower having a lever adapted to be pivoted about a pin connection with surrounding structure, said lever having an arcuate face on one side thereof;

a link means having a roller at one end arranged to cooperate with said arcuate face of said lever;

a valve control rod for controlling said second valve means, said valve control rod being pivotally connected to said link means at the end thereof opposite said roller; and a means to position said link along said arcuate face of said lever connected to said cam follower to vary the travel of said valve control rod as caused by said cam and said cam follower being reciprocated by said pressure responsive means.

2. In a vehicle brake system in accordance with claim 1, a means to actuate said first control valve comprising:

a master cylinder adapted to generate a first and second fluid pressure;

a means to connect said master cylinder to said primary servomotor such that said first fluid pressure will actuate said first control valve; and a means to connect said master cylinder to said secondary servomotor such that said second fluid pressure may be directly communicated to a slave cylinder for said second servomotor.

3. In a vehicle brake system in accordance with claim 1 wherein said means for varying the position of said roller of said link means on said arcuate surface includes a means for referencing the load conditions of the associated vehicle.

4. In a vehicle brake system in accordance with claim 1 wherein said second control valve includes means for sensing the control pressure and the reference pressure of said second servomotor to allow controllable braking by said secondary servomotor.

5. For a vehicle brake system having a primary servomotor and a secondary servomotor actuated by a first and second valve means, respectively, a means to connect said first and second control valve means comprising:
- a pressure responsive member arranged to be suspended between a reference pressure medium and a control pressure medium within said primary servomotor, said pressure responsive means having a force transmitting member operatively connected thereto;
- a lever pivotally connected to surrounding structure and operatively connected to said force transmitting member, said lever having an arcuate face on one side thereof;
- a link means operatively connected to said second control valve, said link means having a roller at one end arranged to cooperate with said arcuate face of said lever; and
- a means to position said roller along said arcuate face of said lever to vary the travel of said link means caused by said pressure responsive member to proportion the actuation of said second control valve in accordance with the control pressure medium within said primary servomotor as modified by said means to position said roller.

6. In a vehicle brake system according to claim 5 wherein said link means includes;
- a first portion forming a valve control rod,
- a second portion forming a connecting link,
- a pivotal connection joining said first portion to said second portion, and
- a means to revolvably connect said roller to said second portion to be operative along said arcuate face of said pivotally arranged lever.

References Cited by the Examiner
UNITED STATES PATENTS 3,008,771 11/1961 Moyer _____ 303—24
3,022,115 2/1962 Hill et al. _____ 303—24

BENJAMIN HERSH, *Primary Examiner.*

EUGENE G. BOTZ, *Examiner.*

M. S. SALES, *Assistant Examiner.*